United States Patent
Itou et al.

(10) Patent No.: US 9,378,867 B2
(45) Date of Patent: Jun. 28, 2016

(54) TERMINAL-FITTED WIRE, TERMINAL-FITTED WIRE MANUFACTURING METHOD AND CORROSION RESISTANT MEMBER

(75) Inventors: Akira Itou, Yokkaichi (JP); Masaharu Ichikawa, Yokkaichi (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 756 days.

(21) Appl. No.: 13/812,876

(22) PCT Filed: Jul. 25, 2011

(86) PCT No.: PCT/JP2011/066842
§ 371 (c)(1),
(2), (4) Date: Apr. 10, 2013

(87) PCT Pub. No.: WO2012/043032
PCT Pub. Date: Apr. 5, 2012

(65) Prior Publication Data
US 2013/0240265 A1    Sep. 19, 2013

(30) Foreign Application Priority Data

Sep. 28, 2010  (JP) ................................ 2010-216727

(51) Int. Cl.
*H01B 17/50*  (2006.01)
*H01B 17/28*  (2006.01)
(Continued)

(52) U.S. Cl.
CPC .............. *H01B 7/2806* (2013.01); *H01B 17/50* (2013.01); *H01R 4/18* (2013.01); *H01R 4/70* (2013.01);
(Continued)

(58) Field of Classification Search
CPC ........ H01B 7/2806; H01B 17/50; H01R 4/18; H01R 4/70; H01R 4/185; H01R 43/005; H01R 43/048; H02G 15/046

USPC ...................................................... 174/84 C
See application file for complete search history.

(56) References Cited

U.S. PATENT DOCUMENTS

| 3,274,330 A | 9/1966 | Becker et al. |
| 3,878,320 A | 4/1975 | Mixon, Jr. et al. |
| 2002/0028612 A1* | 3/2002 | Ushijima ............... H01R 4/187 439/879 |

FOREIGN PATENT DOCUMENTS

| FR | 2503476 | 8/1982 |
| JP | 53055794 | 5/1978 |

(Continued)

OTHER PUBLICATIONS

International Search Report of Oct. 11, 2011.
(Continued)

*Primary Examiner* — Timothy Thompson
*Assistant Examiner* — Paul McGee, III
(74) *Attorney, Agent, or Firm* — Gerald E. Hespos; Michael J. Porco; Matthew T. Hespos (57) ABSTRACT

A terminal-fitted wire includes a wire in which a core is covered by a coating and which includes a core exposed portion at an end, a terminal including a core crimping portion to be crimped and connected to the core exposed portion of the wire, and a corrosion-resistant member. The corrosion-resistant member includes a close-contact portion to be fitted on and held in close contact with the terminal or the coating of the wire at a position either closer to the leading end of the terminal or closer to the coating of the wire than a contact part of the core exposed portion and the core crimping portion and a corrosion-resistant coating extending from the close-contact portion to cover the contact part of the core exposed portion and the core crimping portion and capable of being rolled or folded back from a leading end part toward the close-contact portion.

11 Claims, 4 Drawing Sheets

(51) Int. Cl.
- *H01R 4/18* (2006.01)
- *H01B 7/28* (2006.01)
- *H01R 4/70* (2006.01)
- *H01R 43/00* (2006.01)
- *H02G 15/04* (2006.01)
- *H01R 43/048* (2006.01)

(52) U.S. Cl.
CPC ........... *H01R 43/005* (2013.01); *H02G 15/046* (2013.01); *H01R 4/185* (2013.01); *H01R 43/048* (2013.01)

(56) References Cited

FOREIGN PATENT DOCUMENTS

| | | |
|---|---|---|
| JP | 1-121263 | 8/1989 |
| JP | 01121263 U * | 8/1989 |
| JP | 2001-245428 | 9/2001 |
| JP | 2001245428 A * | 9/2001 |
| JP | 2002-25647 | 1/2002 |
| JP | 2002025647 A * | 1/2002 |
| JP | 2010-165588 | 7/2010 |
| JP | 2010-165630 | 7/2010 |
| JP | 2010165588 A * | 7/2010 |
| JP | 2010165630 A * | 7/2010 |
| WO | 9827632 | 6/1998 |

OTHER PUBLICATIONS

European Patent Appl. No. 11 828 593.1—Search Report issued on Nov. 21, 2014.

* cited by examiner

FIG. 10

TERMINAL-FITTED WIRE, TERMINAL-FITTED WIRE MANUFACTURING METHOD AND CORROSION RESISTANT MEMBER

BACKGROUND OF THE INVENTION

1. Field of the Invention

This invention relates to a technology for suppressing electrolytic corrosion of terminal-fitted wires of harnesses for automotive vehicles and devices.

2. Description of the Related Art

Terminal-fitted wires in which metal terminals are mounted on wire ends may be assembled into harnesses for automotive vehicles and devices and dissimilar metals may be respectively used for cores and terminals of the terminal-fitted wires. In this case, if moisture as electrolyte aqueous solution adheres to a contact part of the dissimilar metals, corrosion (electrolytic corrosion) may occur in the metal having a lower standard electrode potential due to a standard electrode potential difference between the metals.

Accordingly, as a measure to suppress electrolytic corrosion between dissimilar metals as described above, it is thought to arrange a part around a terminal crimping portion where dissimilar metals are in contact in a mold and form a coating by injection molding of a corrosion prevention material (such as polyamide-based thermoplastic resin).

However, since a wire end portion after the terminal is crimped is positioned in the mold according to the above technique, there have been problems that positioning taking into account a terminal crimping position is necessary, which is difficult, and a time required for positioning becomes relatively long. Further, since the coating is formed by injection molding, a processing time from molding to removal from the mold also becomes relatively long.

Accordingly, the present invention aims to efficiently perform an anti-corrosion treatment for a metal contact part of a terminal and a wire.

SUMMARY OF THE INVENTION

The present invention is directed to a terminal-fitted wire, comprising a wire in which a core is covered by a coating and which includes a core exposed portion at an end; a terminal including a core crimping portion to be crimped and connected to the core exposed portion of the wire; and a corrosion-resistant member including a close-contact portion to be fitted on and held in close contact with the terminal or the coating of the wire at a position either closer to the leading end of the terminal or closer to the coating of the wire than a contact part of the core exposed portion and the core crimping portion and a corrosion-resistant coating extending from the close-contact portion to cover the contact part of the core exposed portion and the core crimping portion and capable of being rolled or folded back from a leading end part toward the close-contact portion. Thus, the contact part of the core exposed portion and the core crimping portion can be covered and an anti-corrosion treatment for a metal contact part of the terminal and the wire can be efficiently performed by fitting the corrosion-resistant coating in a rolled or folded-back state on the terminal or the wire and unfolding the corrosion-resistant coating.

The terminal preferably includes a water stop wall portion formed at a position closer to the leading end of the terminal than the contact part of the core exposed portion and the core crimping portion, having an outer peripheral portion with a ring-shaped cross-section and capable of stopping water inside the outer peripheral portion in a longitudinal direction of the terminal; and the corrosion-resistant coating or the close-contact portion is held in close contact with the outer peripheral portion of the water stop wall portion. Thus, by fitting the corrosion-resistant member on the outer peripheral portion of the water stop wall portion, the corrosion-resistant member is more easily held in close contact with the terminal without forming any clearance and anti-corrosion performance can be improved by improving a waterproof property between the terminal and the corrosion-resistant member.

The terminal preferably includes a coating crimping portion to be crimped and connected to the coating of the wire; the close-contact portion of the corrosion-resistant member includes a positioning portion extending toward the leading end of the corrosion-resistant coating at an inner peripheral side of the corrosion-resistant coating; and the coating crimping portion is crimped and connected to the coating with the positioning portion sandwiched therebetween. By crimping and connecting the coating crimping portion to the coating of the wire with the positioning portion sandwiched therebetween, it is possible to more precisely position the corrosion-resistant member, more reliably cover the contact part of the core exposed portion and the core crimping portion and maintain that state.

A reforming recess extending in a circumferential direction may be at a base end part of the corrosion-resistant coating in an inner peripheral portion of the corrosion-resistant member. If the corrosion-resistant coating is rolled or folded back up to the position of the reforming recess, the corrosion-resistant coating is more reliably maintained in the rolled or folded-back state and the contact part of the core exposed portion and the core crimping portion can be more stably covered by the corrosion-resistant coating.

The corrosion-resistant coating may be formed to be narrower toward a leading end part. Thus the leading end part is more strongly held in close contact with the terminal or the wire, whereby the waterproof property and the anti-corrosion performance can be improved.

The invention also is directed to a method for manufacturing a terminal-fitted wire in which a contact part of a core exposed portion exposed from a coating at a wire end portion and a core crimping portion of a terminal to be crimped and connected to the core exposed portion is covered by a corrosion-resistant member. The method includes fitting the tubular corrosion-resistant member rolled or folded back from a leading end part toward a base end part on the terminal or the coating of the wire; crimping and connecting the core crimping portion to the core exposed portion; and unfolding the rolled or folded-back part of the corrosion-resistant member to cover the contact part of the core exposed portion and the core crimping portion. The anti-corrosion treatment for the metal contact part of the terminal and the wire can be efficiently performed since the corrosion-resistant member in the rolled or folded-back state is fitted and the corrosion-resistant coating is unfolded to cover the contact part of the core exposed portion and the core crimping portion.

The invention also is directed to a corrosion-resistant member for covering a contact part of a core exposed portion exposed from a coating at a wire end portion and a core crimping portion of a terminal to be crimped and connected to the core exposed portion, comprising a tubular close-contact portion capable of being held in close contact with an outer peripheral portion of the terminal or the coating of the wire; and a tubular corrosion-resistant coating extending from the close-contact portion and rolled or folded back from a leading end part toward the close-contact portion. Thus the contact part of the core exposed portion and the core crimping portion can be covered and the anti-corrosion treatment for the metal contact part of the terminal and the wire can be efficiently performed by fitting the corrosion-resistant member on the wire or the terminal, bringing the close-contact portion into close contact with the outer peripheral portion of the wire or the terminal and unfolding the rolled or folded-back corrosion-resistant coating.

The close-contact portion preferably includes a positioning portion extending from a base end part of the corrosion-resistant coating to a position closer to the leading end than the corrosion-resistant coating. The coating crimping portion can be crimped and connected to the coating with the positioning portion sandwiched therebetween in a state where the corrosion-resistant member is fitted on the coating since the positioning portion is formed to extend from the base end part of the corrosion-resistant coating to the position closer to the leading end than the corrosion-resistant coating. By crimping and connecting the coating crimping portion to the coating of the wire with the positioning portion sandwiched therebetween, it is possible to more precisely position the corrosion-resistant member, more reliably cover the contact part of the core exposed portion and the core crimping portion and maintain that state.

A reforming recess extending in a circumferential direction may formed at a base end part of the corrosion-resistant coating in an inner peripheral portion of the corrosion-resistant member. If the corrosion-resistant coating is rolled or folded back up to the position of the reforming recess, the corrosion-resistant coating is more reliably maintained in the rolled or folded-back state and the contact part of the core exposed portion and the core crimping portion can be more stably covered by the corrosion-resistant coating.

The corrosion-resistant coating may beformed to be narrower toward a leading end part and rolled or folded back from the leading end part toward a base end part. Since the corrosion-resistant coating is formed to be narrower toward the leading end part, the leading end part is more strongly held in close contact with the terminal or the wire if the corrosion-resistant coating is unfolded to the cover the contact part of the core exposed portion and the core crimping portion, whereby the waterproof property and the anti-corrosion performance can be improved.

DETAILED DESCRIPTION OF THE PREFERRED EMBODIMENTS

Hereinafter, a terminal-fitted wire, a terminal-fitted wire manufacturing method and a corrosion-resistant member according to embodiments are described.

Figure 1:
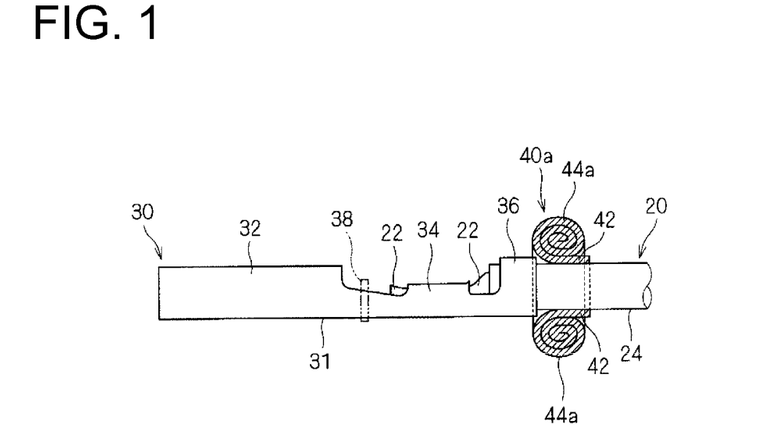
FIG. 1 is a view showing a state where a rolled corrosion-resistant member is fitted on a wire.
Figure 2:
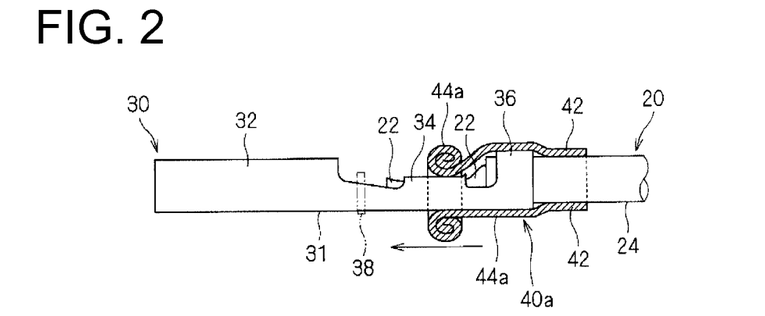
FIG. 2 is a view showing an operation of unfolding the rolled corrosion-resistant member.
Figure 3:
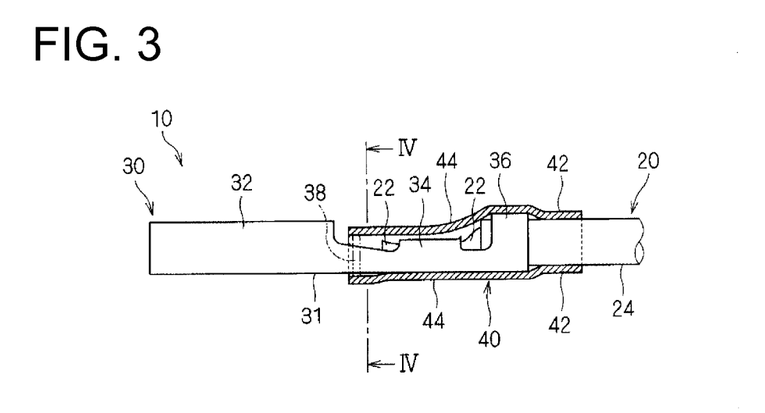
FIG. 3 is a view showing a terminal-fitted wire according to a first embodiment.

First, a terminal-fitted wire 10 according to a first embodiment is described (see FIGS. 1 to 3). This terminal-fitted wire 10 is formed by crimping and connecting a terminal 30 to a wire 20 and covering a part around a crimped portion by a corrosion-resistant member 40. A core of the wire 20 and a main portion of the terminal 30 of the terminal-fitted wire 10 are made of dissimilar metals. An example of the terminal-fitted wire 10 is illustrated below.

The wire 20 is formed such that the outer periphery of the core made of aluminum (or aluminum alloy) wires is covered by a coating 24 made of resin or the like. Here, the core is formed by twisting a plurality of aluminum (or aluminum alloy) wires. A coating material is stripped at an end portion of the wire 20 to expose the core. A part where the coating 24 is stripped to expose the core is referred to as a core exposed portion 22 in the following description.

The terminal 30 is formed to be long in one direction and composed of a main portion including a terminal connecting portion 32, a core crimping portion 34 and a coating crimping portion 36 in this order from a leading end part toward a base end part in a longitudinal direction thereof, and a water stop wall portion 38. The water stop wall portion 38 is described in detail later. More specifically, the main portion of the terminal 30 is configured such that the terminal connecting portion 32, the core crimping portion 34 and the coating crimping portion 36 are connected by a bottom portion 31 extending in the longitudinal direction and spaced apart in the longitudinal direction. This main portion is integrally formed, such as by punching and bending a copper (or copper alloy such as brass or tin-plated copper alloy) plate. Although an example in which the terminal 30 is a female terminal is shown in the respective drawings, the terminal may be a male terminal without being limited to this. Note that an end part of the terminal 30 on the side of the terminal connecting portion 32 is referred to as a leading end part (front side) and an end part on the side of the coating crimping portion 36 is referred to as a base end part (rear side) in the following description.

The terminal connecting portion 32 is a part into which a male terminal is inserted to be connected. More specifically, the terminal connecting portion 32 is in the form of a tube (here, rectangular tube) penetrating in the longitudinal direction of the terminal 30. Specifically, one side wall of the terminal connecting portion 32 is formed by the bottom portion 31 and the bottom portion 31 as this one side wall extends toward the leading end part. A contact piece to be brought into contact with the male terminal is provided in this terminal connecting portion 32 (not shown).

The core crimping portion 34 and the coating crimping portion 36 are respectively provided at the base end side of the terminal connecting portion 32 while being spaced apart in the longitudinal direction of the terminal 30. The core crimping portion 34 and the coating crimping portion 36 are formed to have a substantially U-shaped cross-section with the bottom portion 31 as a base without being bent. Specifically, each of the core crimping portion 34 and the coating crimping portion 36 includes a pair of crimping pieces projecting from lateral ends of the bottom portion 31 and the wire (core exposed portion 22 in the core crimping portion 34, coating 24 in the coating crimping portion 36) can be arranged between the pair of crimping pieces.

Here, parts between the terminal connecting portion 32, the core crimping portion 34 and the coating crimping portion 36 are also formed into grooves having a substantially U-shaped cross-section and including a pair of projecting pieces with a projecting distance shorter than the pairs of the crimping pieces of the core crimping portion 34 and the coating crimping portion 36. The water stop wall portion 38 is formed in the groove-like part between the terminal connecting portion 32 and the core crimping portion 34.

The core crimping portion 34 is crimped and connected to the core exposed portion 22 and the coating crimping portion 36 is crimped and connected to the coating 24 in a state where the wire 20 is arranged on the bottom portion 31 between the respective pairs of crimping pieces of the core crimping portion 34 and the coating crimping portion 36, whereby the terminal 30 is electrically and mechanically connected to the wire 20. Specifically, the terminal 30 is electrically and mechanically connected to the wire 20 by crimping and connecting the core crimping portion 34 to the core exposed portion 22, and positioned with respect to the wire 20 with displacement and detachment more reliably suppressed by crimping and connecting the coating crimping portion 36 to the coating 24.

As described above, the core exposed portion 22 of the wire 20 is made of aluminum (aluminum alloy) and the main portion of the terminal 30 is made of the copper (or copper alloy such as brass or tin-plated copper alloy) plate. Between both metals, the core exposed portion 22 has a relatively lower standard electrode potential than the main portion of the terminal 30. This may cause corrosion (electrolytic corrosion) in the core exposed portion 22 if water (electrolyte aqueous solution) adheres to a contact part of the core crimping portion 34 and the core exposed portion 22. Thus, the terminal-fitted wire 10 according to this embodiment is so configured that the contact part of the core exposed portion 22 and the core crimping portion 34 is covered by the corrosion-resistant member 40.

Figure 4:
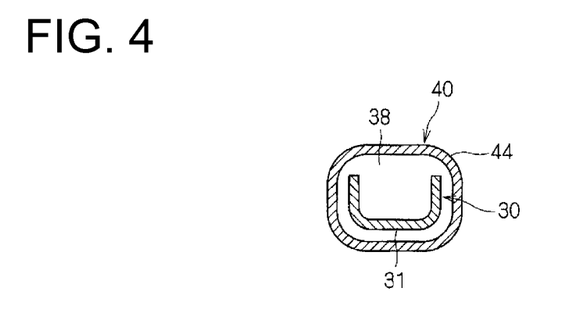
FIG. 4 is a section along IV-IV of FIG. 3.

Here, the water stop wall portion 38 of the terminal 30 is described (see FIGS. 1 and 4). This water stop wall portion 38 is a member for enhancing a degree of adhesion between the terminal 30 and the corrosion-resistant member 40. The water stop wall portion 38 is in the form of a wall substantially perpendicular to the longitudinal direction of the terminal 30. More specifically, the water stop wall portion 38 is formed in a part of the groove-like part between the terminal connecting portion 32 and the core crimping portion 34, i.e. at a position closer to the leading end of the terminal 30 than the contact part of the crimping piece 34 and the core exposed portion 22 to which the crimping piece 34 is crimped and connected. Here, the water stop wall portion 38 is at a distance from the terminal connecting portion 32 and the core crimping portion 34.

This water stop wall portion 38 is formed by positioning the terminal in a forming mold and injecting a molten synthetic resin material into the mold in which the terminal 30 is positioned (insert molding). Various synthetic resin materials such as thermoplastic resins including polyamide, polyester, polypropylene and polyethylene or thermosetting resins including epoxy resin can be used as the resin material. Here, polyamide-based thermoplastic resin is used.

The water stop wall portion 38 is formed to surround the surface of the groove-like part between the terminal connecting portion 32 and the core crimping portion 34 over the entire circumference. The water stop wall portion 38 is also formed to be able to stop water in the longitudinal direction of the terminal 30 inside this outer peripheral part. Specifically, the water stop wall portion 38 has a waterproof property for the surface of this groove-like part, i.e. is held in close contact so as to be able to prevent the entrance of water as electrolyte aqueous solution.

Further, the water stop wall portion 38 includes an outer peripheral portion with a ring-shaped cross-section. More specifically, the outer peripheral portion of the water stop wall portion 38 is formed such that a smooth curve or the curve and a straight line are continuous. Preferably, the outer peripheral portion of the water stop wall portion 38 is formed such that a curve convex toward an outer peripheral side or this curve and a straight line are continuous over the entire circumference. For example, a substantially circular shape, a substantially elliptical shape, a substantially rectangular shape with rounded corners or another shape can be adopted as the outer peripheral shape of the water stop wall portion 38.

The corrosion-resistant member 40 is a member for covering the core crimping portion 34 of the terminal and the core exposed portion 22 of the wire 20 to which the core crimping portion 34 is crimped and connected (see FIGS. 1 to 3). The corrosion-resistant member 40 is a member having a long tube shape (here a substantially cylindrical shape) and includes a close-contact portion 42 and a corrosion-resistant coating 44.

The close-contact portion 42 is in the form of a tube which can be held in close contact with the outer periphery of the coating 24 of the wire 20 in a state fitted on the coating 24. More specifically, the close-contact portion 42 is so formed that the inner peripheral surface is held in close contact with the outer peripheral surface of the coating 24 to exhibit a waterproof property when being fitted on the coating 24 by setting an inner peripheral dimension thereof smaller than an outer peripheral dimension of the coating 24.

The corrosion-resistant coating 44 is in the form of a tube extending from the close-contact portion 42 and rolled (wound) from the leading end part toward the close-contact portion 42 (toward the base end part). More specifically, while a leading end part of a tubular body is widened radially outwardly, the corrosion-resistant coating 44 is turned back toward the base end part and rolled toward the close-contact portion 42 along the outer peripheral surface of the tubular body to enfold the leading end part inside. The corrosion-resistant coating 44 can be unfolded from the rolled state and comes to have a tubular shape by being unfolded. Here, a state of the rolled corrosion-resistant coating 44 is referred to as a rolled state (see FIG. 1) as a turned-back state and a state of the corrosion-resistant coating 44 unfolded from the rolled state is referred to as an unfolded state (see FIG. 3). Specifically, the corrosion-resistant coating 44 is formed to be deformable between the rolled state and the unfolded state. The corrosion-resistant coating 44a in the rolled state is doughnut-shaped and arranged on the outer peripheral surface of the close-contact portion 42.

Further, the corrosion-resistant member 40 also assumes a rolled state and an unfolded state in correspondence with the states of the corrosion-resistant coating 44. Note that, although described later, the corrosion-resistant member 40 is mounted in the rolled state on the wire 20 and covers the core crimping portion 34 and the core exposed portion 22 by being deformed from the rolled state to the unfolded state.

Further, an inner peripheral dimension of the corrosion-resistant coating 44 is set smaller than an outer peripheral dimension of the water stop wall portion 38 of the terminal. Specifically, the corrosion-resistant coating 44 is so formed that the inner peripheral surface is held in close contact with the outer peripheral portion of the water stop wall portion 38 to exhibit the waterproof property when being mounted on the water stop wall portion 38.

The corrosion-resistant member 40 may be formed into a tubular shape (unfolded state) by extrusion molding, injection molding or the like using a synthetic resin material, a rubber material or the like which is substantially impervious to water as electrolyte aqueous solution. This corrosion-resistant member 40 may be made of a material with excellent flexibility and stretch properties and formed to be thin so that the corrosion-resistant coating 44 can be turned back and rolled. Further, the inner peripheral surface of the corrosion-resistant member 40 may be formed to be smooth so as to be easily held in close contact with the wire 20 or the terminal 30. Further, the corrosion-resistant member 40 is preferably made of a material with excellent heat resistance (e.g. material usable in an environment of 100° C.). More specifically, silicon-based rubber, acrylic-based rubber or the like can be used as the material of the corrosion-resistant member 40.

Note that the corrosion-resistant member 40 may be so formed that the close-contact portion 42 has a smaller inner diameter than the corrosion-resistant coating 44 and is thick in terms of adhesion force.

Figure 5:
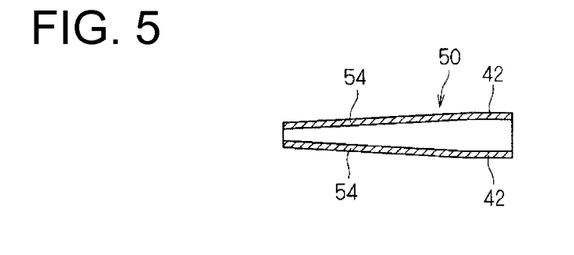
FIG. 5 is a view showing the corrosion-resistant member tapered toward a leading end part.

Further, in terms of adhesion force, a corrosion-resistant coating 54 may be tapered toward the leading end part as in a corrosion-resistant member 50 of FIG. 5. This can enhance the waterproof property by increasing an adhesion force to the terminal 30 at the leading end part of the corrosion-resistant member 50 and can improve anti-corrosion performance of a part covered by the corrosion-resistant member 50. However, a configuration including a fixed diameter part and a reduced diameter part and the like may be also adopted as a configuration in which the corrosion-resistant coating 54 is narrowed toward the leading end part. Note that the corrosion-resistant member 50 may be formed by injection molding in the case of adopting such a configuration.

The corrosion-resistant member 40 used for the terminal-fitted wire 10 is described (see FIG. 4).

The close-contact portion 42 is fitted on and held in close contact with the coating 24 of the wire 20 at a base end side position of the terminal 30 with respect to the contact part of the core exposed portion 22 and the core crimping portion 34. More specifically, the close-contact portion 42 is fitted at a position immediately behind a part of the coating 24 where the coating crimping portion 36 is crimped and connected, and the inner peripheral surface thereof is held in close contact with the outer peripheral surface of the coating 24 to exhibit the waterproof property. However, the close-contact portion 42 may be fitted on the coating crimping portion 36 and held in close contact with the outer peripheral surface thereof.

The corrosion-resistant coating 44 extends from the close-contact portion 42 toward the leading end part of the terminal 30 to cover the contact part of the core exposed portion 22 and the core crimping portion 34. More specifically, the corrosion-resistant coating 44 covers from a leading end part of the close-contact portion 42 to a position closer to the leading end of the terminal 30 than the water stop wall portion 38 and closer to the base end than the terminal connecting portion 32. A leading end part of the corrosion-resistant coating 44 is held in close contact with the outer peripheral portion of the water stop wall portion 38. Note that it does not matter whether or not the corrosion-resistant coating 44 is held in close contact with parts of the wire 20 and the terminal 30 covered thereby besides at the outer peripheral portion of the water stop wall portion 38.

In this way, the terminal-fitted wire 10 is made waterproof between the position of the coating 24 where the close-contact portion 42 of the corrosion-resistant member 40 is held in contact and the position of the water stop wall portion 38 with which the corrosion-resistant coating 44 is held in close contact in the longitudinal direction of the terminal 30. Specifically, this range is a corrosion resistant structure of the terminal-fitted wire 10.

The above terminal-fitted wire 10 is manufactured as follows (see FIGS. 1 to 3). Here, it is assumed that the terminal 30 is not crimped and connected to the wire 20 yet. Note that a state after the following steps (a) and (b) is shown in FIG. 1.

First, the corrosion-resistant coating 44 of the corrosion-resistant member 40 is deformed into the rolled state (see FIG. 1). Specifically, the corrosion-resistant coating 44 is rolled (wound) radially outwardly and the rolled corrosion-resistant coating 44 is arranged on the outer peripheral surface of the close-contact portion 42. However, the corrosion-resistant member 40*a* set in the rolled state beforehand may be supplied.

The corrosion-resistant member 40*a* rolled from the leading end part toward the base end part is fitted on the coating 24 of the wire 20 (step (a), see FIG. 1). Here, since the inner peripheral dimension of the close-contact portion 42 is set smaller than the outer peripheral dimension of the coating 24, the wire 20 is inserted into the close-contact portion 42 while the close-contact portion 42 is widened radially outwardly. By fitting the corrosion-resistant member 40*a* in the rolled state on the coating 24, the close-contact portion 42 is held in close contact with the outer peripheral surface of the coating 24. Here, the posture of the corrosion-resistant member 40*a* is such that a base end part of the close-contact portion extends from the area of the core exposed portion 22 toward the area of the coating 24. Note that since the coating crimping portion 36 is not crimped and connected to the coating 24 yet at this point of time, the corrosion-resistant member 40*a* may be arranged at a position (behind (to the right of) the position of FIG. 1) behind the crimped and connected position of the coating crimping portion 36 on the coating 24 where the corrosion-resistant member 40*a* does not interfere with crimping dies for crimping the coating crimping portion 36.

Subsequently, the core crimping portion 34 is crimped and connected to the core exposed portion 22 and the coating crimping portion 36 is crimped to the coating 24 (step (b), see FIG. 1). More specifically, the terminal 30 is so positioned that the core crimping portion 34 and the coating crimping portion 36 are respectively located between a pair of dies for crimping the core crimping portion 34 and between a pair of dies for crimping the coating crimping portion 36. Simultaneously with this, the core exposed portion 22 is arranged inside the core crimping portion 34 and the coating 24 is arranged inside the coating crimping portion 36. In this state, the core crimping portion 34 is crimped and connected to the core exposed portion 22 and the coating crimping portion 36 is crimped and connected to the coating 24 by moving each pair of dies toward each other.

In a state where the terminal 30 is crimped and connected to the wire 20, the corrosion-resistant member 40*a* in the rolled state may be moved to a position where the close-contact portion 42 is held in close contact with the coating 24 immediately behind the coating crimping portion 36 (or a position where the close-contact portion 42 is fitted on the coating crimping portion 36). Note that the corrosion-resistant member 40*a* may not be moved if being already at the above position.

After the terminal 30 is crimped and connected to the wire 20, the corrosion-resistant coating 44*a* in the rolled state is unfolded to cover the contact part of the core exposed portion 22 and the core crimping portion 34 (step (c)). More specifically, the corrosion-resistant coating 44*a* in the rolled state is unfolded by being rolled toward the leading end part of the terminal 30 (see FIG. 2). In other words, the coating crimping portion 36, the core exposed portion 22, the core crimping portion 34 and the water stop wall portion 38 are covered in this order toward the leading end part of the terminal 30 by the corrosion-resistant coating 44a. Note that an intermediate state of deformation from the rolled state to the unfolded state is also denoted by the same reference signs (40a, 44a) as the rolled state in FIG. 2 and these reference signs are also used in the description. The corrosion-resistant coating 44a is unfolded up to the leading end part and the leading end part of the corrosion-resistant coating 44a is mounted on the water stop wall portion 38 and held in close contact with the outer peripheral portion of the water stop wall portion 38. In this way, the corrosion-resistant member 40 is unfolded and mounted to exhibit the waterproof property inside and outside between the position of the coating 24 closer to the base end than the coating crimping portion 36 and the position of the water stop wall portion 38.

By the above steps, the terminal-fitted wire 10 is manufactured. The above series of steps may be performed by a dedicated machine or manually performed by an operator.

However, the corrosion-resistant member 40a in the rolled state may be fitted on the wire 20 before or during a step of cutting and stripping the wire 20.

Although the corrosion-resistant member 40 turned back into the rolled state (44a) has been, thus far, described as an example, there is no limitation to this. Specifically, the corrosion-resistant coating 44 is in the form of a tube extending from the close-contact portion 42 and folded back from the leading end part toward the close-contact portion 24 (see FIG. 6). More specifically, the corrosion-resistant coating 44 can be folded and turned back at the base end part thereof so that the inner peripheral surface faces radially outwardly and unfolded into a tubular shape from that state. Here, a state of the folded-back corrosion-resistant coating 44 is a folded-back state as the turned-back state. The corrosion-resistant coating 44b in the folded-back state extends from the leading end part toward the base end part of the close-contact portion 42 while being placed on the outer periphery of the close-contact portion 42.

This corrosion-resistant member 40 may be made of a material with excellent flexibility and stretch properties and formed to be thin so that the corrosion-resistant coating 44 can be folded back.

Figure 6:
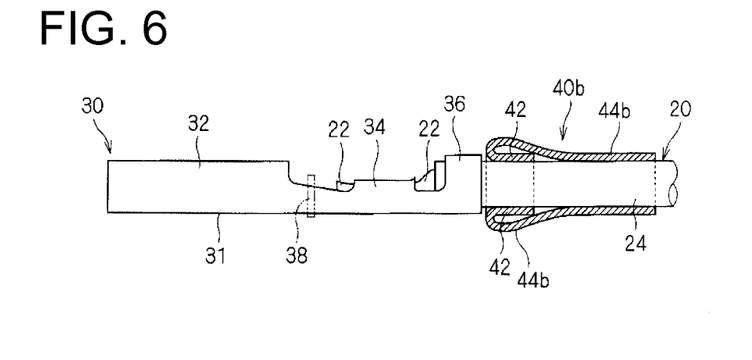
FIG. 6 is a view showing a state where the folded corrosion-resistant member is fitted on a wire.
Figure 7:
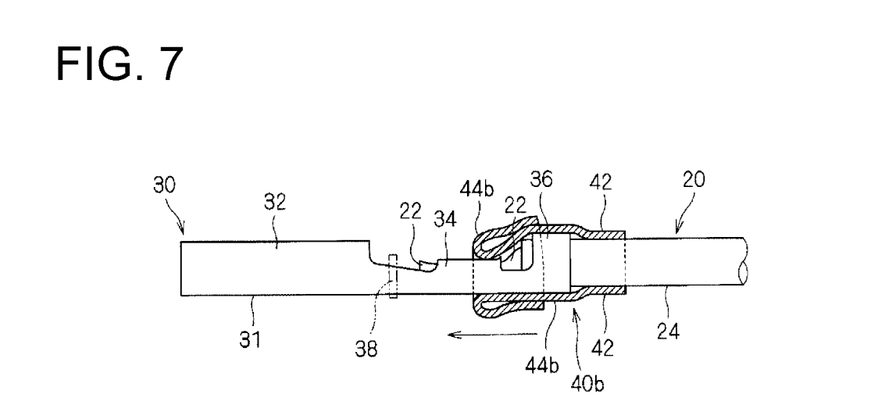
FIG. 7 is a view showing an operation of unfolding the folded corrosion-resistant member.

In the manufacturing process, the corrosion-resistant coating 44 of the corrosion-resistant member 40 is first folded back and deformed into the folded-back state (44b) (see FIG. 6). In the step (a), the corrosion-resistant member 40b is fitted on the coating 24 in such a posture that the leading end part of the corrosion-resistant coating 44b in the folded-back state faces toward the back side of the wire 20 (from the core exposed portion 22 toward the coating 24). After the terminal 30 is crimped and connected to the wire 20 (step (b)), the corrosion-resistant coating 44a in the folded-back state is unfolded to move the leading end part thereof toward the leading end part of the terminal 30 and deformed into the unfolded state (see FIG. 7) in the step (c). Also by the above steps, it is possible to manufacture the terminal-fitted wire 10 in which the contact part of the core exposed portion 22 and the core crimping portion 34 is covered by the corrosion-resistant member 40.

However, the corrosion-resistant member 40b in the folded-back state is not limited to the above configuration and the corrosion-resistant coating 44 may be folded back a plurality of times. For example, the corrosion-resistant coating 44 may be folded back a plurality of times from the leading end part toward the base end part or may be folded back a plurality of times alternately from the leading end part toward the base end part and from the base end part toward the leading end part.

Further, the corrosion-resistant member 40 is not limited to the above shapes. For example, a reforming recess 68 extending in a circumferential direction may be formed on a base end part of a corrosion-resistant coating 64 in an inner peripheral portion as in a corrosion-resistant member 60 shown in FIG. 8. More specifically, the reforming recess 68 is formed on a bent part of the corrosion-resistant coating 64b in a folded-back state (corrosion-resistant member 60b), i.e. on a base end part of the corrosion-resistant coating 64b. That is, the corrosion-resistant member 60 is thinned at a part where the reforming recess 68 is formed and more easily bent. The corrosion-resistant member 60 is less likely to be unfolded from the folded-back state unless an external force for unfolding is applied, and can be more reliably maintained in the folded-back state. Further, by bending and folding back the corrosion-resistant coating 64 at the position of the reforming recess 68, the corrosion-resistant coating 64 can be folded back substantially in the same manner every time. In this way, it can be suppressed that the folded-back position differs every time and the terminal-fitted wire in which the contact part of the core exposed portion 22 and the core crimping portion 34 is covered by the corrosion-resistant member 60 can be formed to have substantially the same shape every time. Specifically, product form can be made stable by reducing product-to-product differences.

Figure 8:
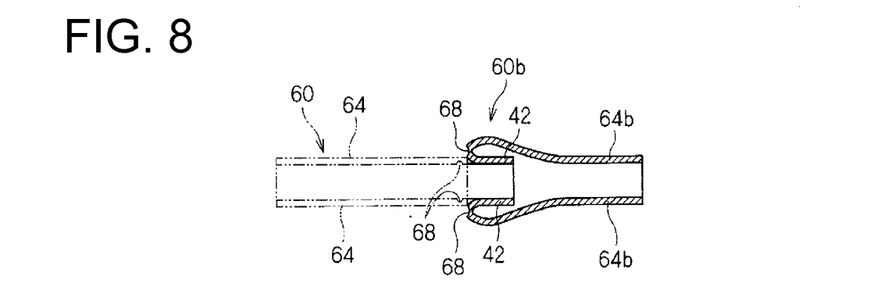
FIG. 8 is a view showing a corrosion-resistant member formed with a reforming recess.

Note that although the corrosion-resistant member 60b in the folded-back state is shown in FIG. 8, similar effects can be also achieved by the corrosion-resistant member 40a in the rolled state. Specifically, the thinned part becomes easily bendable by forming the reforming recess (68), and effects similar to the above can be obtained when the corrosion-resistant coating 44a is rolled up to the reforming recess.

Thus far, the terminal-fitted wire 10 has been described by way of an example in which the close-contact portion 42 of the corrosion-resistant member 40 is fitted on the wire 20 and held in close contact with an outer peripheral portion of the wire 20 at the position closer to the base end of the terminal 30 than the contact part of the core crimping portion 34 and the core exposed portion 22. However, the terminal-fitted wire 10 is not limited to this.

Specifically, the terminal-fitted wire may be so configured that the close-contact portion 42 of the corrosion-resistant member 40 is fitted on the terminal 30 and held in close contact with an outer peripheral portion of the terminal 30 at a position closer to the leading end part of the terminal 30 than the contact part of the core crimping portion 34 and the core exposed portion 22. More specifically, the close-contact portion 42 of the corrosion-resistant member 40 may be formed to be able to be held in close contact with the outer peripheral portion of the water stop wall portion 38 of the terminal 30. That is, it is sufficient to set the inner peripheral dimension of the close-contact portion 42 smaller than the outer peripheral dimension of the water stop wall portion 38.

At the time of manufacturing the terminal-fitted wire, the corrosion-resistant member 40a (40b) in the turned-back state is fitted on the terminal 30 (step (a)). More specifically, the close-contact portion 42 is mounted on the water stop wall portion 38 and held in close contact with the outer peripheral portion of the water stop wall portion 38. However, the close-contact portion 42 may be mounted on the water stop wall portion 38 after the step (b) of crimping and connecting the terminal 30 to the wire 20.

Further, although the corrosion-resistant member 40a (40b) in the turned-back state is fitted on the wire 20 or the terminal 30 before the step (b) of crimping and connecting the terminal 30 to the wire 20 in the example described thus far, the step (b) may be performed before the step (a). For example, if a terminal is a male terminal, a terminal connecting portion is formed into a bar shape. Thus, the corrosion-resistant member 40 can be relatively easily fitted after crimping is performed.

Specifically, the corrosion-resistant member 40 only has to be able to cover the contact part of the core exposed portion 22 and the core crimping portion 34 and the fitted position and an unfolding direction may be appropriately determined.

Further, although the example of using the terminal including the coating crimping portion 36 has been described, a terminal including no coating crimping portion 36 may also be used.

Further, the water stop wall portion 38 of the terminal 30 may be omitted. Specifically, the water stop wall portion 38 can be omitted if the corrosion-resistant member 40 can be held in close contact with a part between the terminal connecting portion 32 and the core crimping portion 34 over the entire circumference without forming any clearance, e.g. if this intermediate part is formed only by the bottom portion 31 and plate-like and the inner peripheral dimension of the corrosion-resistant member 40 is smaller than an outer peripheral dimension of the plate-like part.

According to the corrosion-resistant member 40, the terminal-fitted wire 10 and the manufacturing method therefor configured as described above, the corrosion-resistant coating 44 of the corrosion-resistant member 40 is formed to be able to be rolled or folded back. Thus, the core exposed portion 22 and the core crimping portion 34 can be covered and an anti-corrosion treatment can be efficiently performed for the metal contact part of the terminal 30 and the wire 20 by fitting the corrosion-resistant member 40a, 40b in the turned-back state (rolled state or folded-back state) on the coating 24 of the wire 20 and unfolding the corrosion-resistant coating 44a, 44b in the turned-back state and deforming it into the unfolded state.

Further, if the rolled state is adopted as the turned-back state of the corrosion-resistant member 40, the corrosion-resistant coating 44 in the rolled state can be easily unfolded by being rolled. On the other hand, if the folded-back state is adopted as the turned-back state of the corrosion-resistant member 40, the corrosion-resistant coating 44 can be easily deformed into the folded-back state only by being folded back at one position.

Further, the terminal 30 includes the water stop wall portion 38 having the outer peripheral portion with a ring-shaped cross-section. Thus, by mounting the corrosion-resistant member 40 on the outer peripheral portion of the water stop wall portion 38, the corrosion-resistant member 40 can be held in close contact with the terminal 30 without forming any clearance and anti-corrosion performance can be improved by improving the waterproof property between the terminal 30 and the corrosion-resistant member 40.

Figure 9:
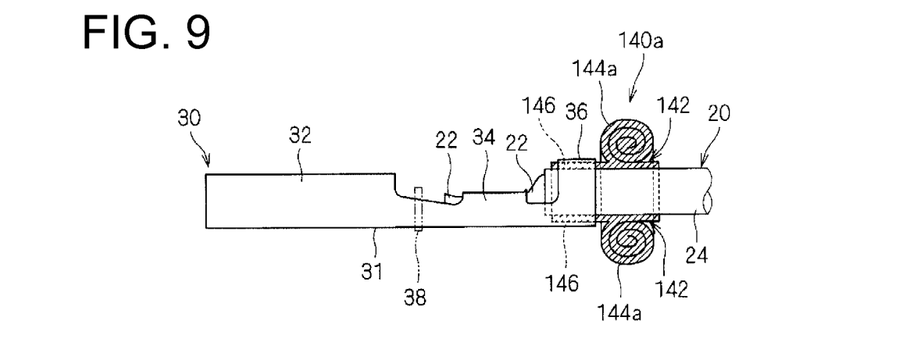
FIG. 9 is a view showing a state where a rolled corrosion-resistant member including a positioning portion is fitted on a wire.
Figure 10:
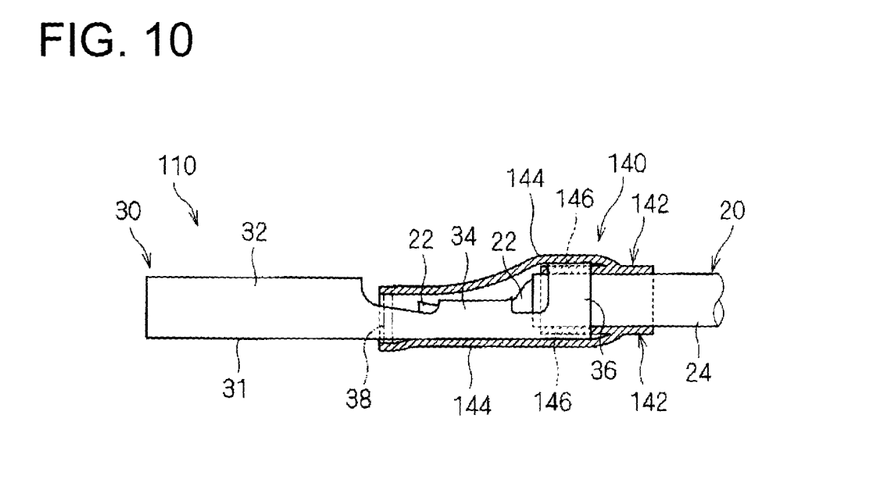
FIG. 10 is a view showing a terminal-fitted wire according to a second embodiment.

Next, a terminal-fitted wire 110 according to a second embodiment is described (see FIGS. 9 and 10). Note that configurations, steps and the like similar to those of the terminal-fitted wire 10 according to the first embodiment are denoted by the same reference signs and not described.

This terminal-fitted wire 110 is provided with a corrosion-resistant member 140 including a positioning portion 146 instead of the corrosion-resistant member 40 described above.

More specifically, a close-contact portion 142 of the corrosion-resistant member 140 includes the positioning portion 146. The positioning portion 146 extends from a base end part of a corrosion-resistant coating 144 to a position closer to the leading end than the corrosion-resistant coating 144a in a rolled state (see FIG. 9) and extends at an inner peripheral side of the corrosion-resistant coating 144 in an unfolded state (see FIG. 10).

Here, the positioning portion 146 is a part at the leading end side of the close-contact portion 142 and formed into a tubular shape. Specifically, the corrosion-resistant member 140 in the unfolded state extends from a rear end part of the close-contact portion 142 while the corrosion-resistant coating 144 (outer peripheral side) and the positioning portion 146 (inner peripheral side) overlap in inward and outward directions. However, the positioning portion 146 may be an extending piece having an arcuate cross-section without being limited to the tubular shape.

An extending length of the positioning portion 146 is set to be larger than that of the coating crimping portion 36 in the longitudinal direction of the terminal 30. Further, the extending length of the positioning portion 146 is smaller than that of the corrosion-resistant coating 144 and a difference between them is set at least larger than a dimension between the front end of the water stop wall portion 38 and the rear end of the core crimping portion 34. Specifically, the respective dimensions are so set that the coating crimping portion 36 is crimped and connected to the positioning portion 146, but the core crimping portion 34 is not crimped and connected to the positioning portion 146 and the corrosion-resistant coating 144 can cover up to the water stop wall portion 38.

This corrosion-resistant member 140 may be formed by injection molding.

In the terminal-fitted wire 110, the coating crimping portion 36 is crimped and connected to the coating 24 with the positioning portion 146 sandwiched therebetween (see FIG. 10). Specifically, the positioning portion 146 is arranged between the coating 24 and the coating crimping portion 36 while being held in close contact with the outer peripheral surface of the coating 24. The corrosion-resistant coating 144 covers the contact part of the core exposed portion 22 and the core crimping portion 34 while passing through the outer peripheral side of the positioning portion 146 and the coating crimping portion 36.

At the time of manufacturing the terminal-fitted wire 110, after the corrosion-resistant member 140 is deformed into the rolled state, the corrosion-resistant member 140a is so fitted that the positioning portion 146 is arranged at a position of the coating 24 where the coating crimping portion 36 is to be crimped and connected in the step (a) of fitting the corrosion-resistant member 140a in the rolled state on the terminal 30 (see FIG. 9). At this position, the corrosion-resistant coating 144a in the rolled state is arranged at the coating 24 side of the position, where the coating crimping portion 36 is to be crimped and connected, opposite to the core exposed portion 22. Specifically, the position of the corrosion-resistant coating 144a is located at the coating 24 side to such an extent that the coating crimping portion 36 is not crimped and connected thereto and dies for crimping the coating crimping portion 36 do not interfere therewith.

In the step (b) of crimping and connecting the terminal 30 to the wire 20, the coating crimping portion 36 is crimped and connected to the coating 24 with the positioning portion 146 sandwiched therebetween (see FIG. 9). Specifically, the part of the coating 24 where the positioning portion 146 is fitted is arranged inside the coating crimping portion 36 and the coating crimping portion 36 is crimped and connected to the coating 24 together with the positioning portion 146 by a pair of dies. Note that, in this case, a width between a pair of projecting pieces of the coating crimping portion 36 is so set that the positioning portion 146 to be fitted on the coating 24 can be arranged. Further, a projecting distance of this pair of projecting pieces is also so set that the projecting pieces can be crimped while sandwiching the positioning portion 146.

When the terminal 30 is crimped and connected to the wire 20, the corrosion-resistant coating 144a in the rolled state is unfolded to cover the contact part of the core exposed portion 22 and the core crimping portion 34 (step (c)).

By the above steps, the terminal-fitted wire 10 is manufactured.

However, the corrosion-resistant member 140 including the positioning portion 146 is not limited to the above shape. For example, a corrosion-resistant member may be formed such that a base end part of a close-contact portion and that of the corrosion-resistant coating 144 are connected and the close-contact portion and the corrosion-resistant coating 144 extend in the same direction and overlap in inward and outward directions.

Further, although the turned-back state of the corrosion-resistant coating 144 in the terminal-fitted wire 110 has been the rolled state (144a) in the example described thus far, the turned-back state may be a folded-back state.

Further, various modifications described with respect to the terminal-fitted wire 10 according to the first embodiment can be adopted as appropriate also in this terminal-fitted wire 110.

According to the corrosion-resistant member 140, the terminal-fitted wire 110 and the manufacturing method therefor configured as described above, the positioning portion 146 extends toward the leading end of the corrosion-resistant coating 144 at the inner peripheral side of the corrosion-resistant coating 144. Thus, the coating crimping portion 36 can be crimped and connected to the coating 24 with the positioning portion 146 sandwiched therebetween in a state where the corrosion-resistant member 140a with the rolled or folded-back corrosion-resistant coating 144a is fitted on the coating. By crimping and connecting the coating crimping portion 36 to the coating 24 with the positioning portion 146 sandwiched therebetween, the corrosion-resistant member 140 is more precisely positioned. In this way, it is possible to suppress a displacement of the corrosion-resistant member 140 in an extending direction of the wire 20 in a state fitted on the coating 24, reliably cover the contact part of the core exposed portion 22 and the core crimping portion 34 by the corrosion-resistant member 140 and more reliably maintain the state where the contact part of the core exposed portion 22 and the core crimping portion 34 is covered after the unfolding.

Further, since the coating crimping portion 36 is crimped and connected to the coating 24 with the positioning portion 146 sandwiched therebetween, the close-contact portion 142 (positioning portion 146) is strongly held in close contact with the outer peripheral surface of the coating 24 also by a pressing force by the coating crimping portion 36, which contributes to an improvement in waterproof property, i.e. an improvement in anti-corrosion performance.

Although the terminal-fitted wires 10, 110, the terminal-fitted wire manufacturing methods and the corrosion-resistant members 40, 50, 60 and 140 have been described in detail above, the above description is illustrative in all aspects and this invention is not limited to those. It should be appreciated that unillustrated innumerable modifications can be envisaged without departing from the scope of this invention.

The invention claimed is:

1. A terminal-fitted wire, comprising:
a wire in which a core is covered by a coating and which includes a core exposed portion at an end;
a terminal including a core crimping portion to be crimped and connected to the core exposed portion of the wire; and
a corrosion-resistant member including a close-contact portion to be fitted on and held in close contact with the terminal or the coating of the wire at a position either closer to the leading end of the terminal or closer to the coating of the wire than a contact part of the core exposed portion and the core crimping portion and a corrosion-resistant coating extending from the close-contact portion to cover the contact part of the core exposed portion and the core crimping portion and capable of being rolled or folded back from a leading end part toward the close-contact portion,
wherein:
the terminal includes a coating crimping portion to be crimped and connected to the coating of the wire;
the close-contact portion of the corrosion-resistant member includes a positioning portion extending toward the leading end of the corrosion-resistant coating at an inner peripheral side of the corrosion-resistant coating; and
the coating crimping portion is crimped and connected to the coating with the positioning portion sandwiched therebetween.

2. A terminal-fitted wire, comprising:
a wire in which a core is covered by a coating and which includes a core exposed portion at an end;
a terminal including a core crimping portion to be crimped and connected to the core exposed portion of the wire; and
a corrosion-resistant member including a close-contact portion to be fitted on and held in close contact with the terminal or the coating of the wire at a position either closer to the leading end of the terminal or closer to the coating of the wire than a contact part of the core exposed portion and the core crimping portion and a corrosion-resistant coating extending from the close-contact portion to cover the contact part of the core exposed portion and the core crimping portion and capable of being rolled or folded back from a leading end part toward the close-contact portion,
wherein a reforming recess extending in a circumferential direction is formed at a base end part of the corrosion-resistant coating in an inner peripheral portion of the corrosion-resistant member.

3. A terminal-fitted wire according to claim 2, wherein the corrosion-resistant coating is formed to be narrower toward a leading end part.

4. A method for manufacturing a terminal-fitted wire in which a contact part of a core exposed portion exposed from a coating at a wire end portion and a core crimping portion of a terminal to be crimped and connected to the core exposed portion is covered by a corrosion-resistant member, comprising:
(a) fitting the tubular corrosion-resistant member rolled or folded back from a leading end part toward a base end part on the coating of the wire;
(b) crimping and connecting the core crimping portion to the core exposed portion;
(c) unfolding the rolled or folded-back part of the corrosion-resistant member to cover the contact part of the core exposed portion and the core crimping portion,
wherein:
the terminal includes a coating crimping portion to be crimped and connected to the coating of the wire;
the close-contact portion of the corrosion-resistant member includes a positioning portion extending toward the leading end of the corrosion-resistant coating at an inner peripheral side of the corrosion-resistant coating; and the coating crimping portion is crimped and connected to the coating with the positioning portion sandwiched therebetween in the step (b).

5. A corrosion-resistant member for covering a contact part of a core exposed portion exposed from a coating at a wire end portion and a core crimping portion of a terminal to be crimped and connected to the core exposed portion, comprising:
- a tubular close-contact portion capable of being held in close contact with an outer peripheral portion of the terminal or the coating of the wire; and
- a tubular corrosion-resistant coating extending from the close-contact portion and rolled or folded back from a leading end part toward the close-contact portion;
- wherein the close-contact portion includes a positioning portion extending from a base end part of the corrosion-resistant coating to a position closer to the leading end than the corrosion-resistant coating.

6. A corrosion-resistant member for covering a contact part of a core exposed portion exposed from a coating at a wire end portion and a core crimping portion of a terminal to be crimped and connected to the core exposed portion, comprising:
- a tubular close-contact portion capable of being held in close contact with an outer peripheral portion of the terminal or the coating of the wire; and
- a tubular corrosion-resistant coating extending from the close-contact portion and rolled or folded back from a leading end part toward the close-contact portion;
- wherein a reforming recess extending in a circumferential direction is formed at a base end part of the corrosion-resistant coating in an inner peripheral portion of the corrosion-resistant member.

7. A corrosion-resistant member according to claim 5, wherein the corrosion-resistant coating is formed to be narrower toward a leading end part and rolled or folded back from the leading end part toward a base end part.

8. A terminal-fitted wire according to claim 2, wherein:
- the terminal includes a water stop wall portion formed at a position closer to the leading end of the terminal than the contact part of the core exposed portion and the core crimping portion, having an outer peripheral portion with a ring-shaped cross-section and capable of stopping water inside the outer peripheral portion in a longitudinal direction of the terminal; and
- the corrosion-resistant coating or the close-contact portion is held in close contact with the outer peripheral portion of the water stop wall portion.

9. A corrosion-resistant member according to claim 6, wherein the corrosion-resistant coating is formed to be narrower toward a leading end part and rolled or folded back from the leading end part toward a base end part.

10. A terminal-fitted wire according to claim 1, wherein the corrosion-resistant coating is formed to be narrower toward a leading end part.

11. A terminal-fitted wire according to claim 1, wherein:
- the terminal includes a water stop wall portion formed at a position closer to the leading end of the terminal than the contact part of the core exposed portion and the core crimping portion, having an outer peripheral portion with a ring-shaped cross-section and capable of stopping water inside the outer peripheral portion in a longitudinal direction of the terminal; and
- the corrosion-resistant coating or the close-contact portion is held in close contact with the outer peripheral portion of the water stop wall portion.

* * * * *